(12) United States Patent
Danura et al.

(10) Patent No.: US 12,092,286 B2
(45) Date of Patent: Sep. 17, 2024

(54) VEHICLE LAMP

(71) Applicant: Ichikoh Industries, Ltd., Isehara (JP)

(72) Inventors: Soichiro Danura, Isehara (JP); Hideyuki Hayashi, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 0 days.

(21) Appl. No.: 18/548,959

(22) PCT Filed: Mar. 10, 2022

(86) PCT No.: PCT/JP2022/010546
§ 371 (c)(1),
(2) Date: Sep. 5, 2023

(87) PCT Pub. No.: WO2022/191275
PCT Pub. Date: Sep. 15, 2022

(65) Prior Publication Data
US 2024/0151383 A1    May 9, 2024

(30) Foreign Application Priority Data
Mar. 12, 2021  (JP) .................................. 2021-040634

(51) Int. Cl.
*F21S 43/20* (2018.01)
*F21S 43/14* (2018.01)
(Continued)

(52) U.S. Cl.
CPC .............. *F21S 43/26* (2018.01); *F21S 43/14* (2018.01); *F21S 43/31* (2018.01); *F21V 11/14* (2013.01); *F21W 2104/00* (2018.01)

(58) Field of Classification Search
CPC . F21S 43/14; F21S 43/26; F21S 43/31; F21V 11/14–16; F21W 2104/00
See application file for complete search history.

(56) References Cited

FOREIGN PATENT DOCUMENTS

| | | | | |
|---|---|---|---|---|
| DE | 102004061691 A1 | * | 7/2006 | ............ F21S 48/215 |
| JP | 2008-243794 A | | 10/2008 | |
| JP | 2018-6026 A | | 1/2018 | |

OTHER PUBLICATIONS

International Search Report issued May 17, 2022 in PCT/JP2022/010546, filed on Mar. 10, 2022, 2 pages.

(Continued)

*Primary Examiner* — Jason M Han
(74) *Attorney, Agent, or Firm* — Oblon, McClelland, Maier & Neustadt, L.L.P.

(57) ABSTRACT

A vehicle lamp suppressing design deterioration due to moire is provided. The vehicle lamp includes: a first plate material including a plurality of first light transmissive areas transmitting light therethrough and a first light non-transmissive area positioned between the plurality of first light transmissive areas and not transmitting light therethrough; a second plate material including a plurality of second light transmissive areas transmitting light therethrough and a second light non-transmissive area positioned between the plurality of second light transmissive areas and not transmitting light therethrough, the second plate material being layered on the first plate material; and a light source that emits light via the plurality of first light transmissive areas of the first plate material and the plurality of second light transmissive areas of the second plate material, where the plurality of second light transmissive areas are larger, in acreage, than the plurality of first light transmissive areas.

4 Claims, 8 Drawing Sheets

(51) Int. Cl.
*F21S 43/31* (2018.01)
*F21V 11/14* (2006.01)
*F21W 104/00* (2018.01)

(56) References Cited

OTHER PUBLICATIONS

Office Action dated Jul. 23, 2024 issued in corresponding Japanese Patent Application No. 2021-040634 (with English translation).

\* cited by examiner

VEHICLE LAMP

TECHNICAL FIELD

The present invention relates to a vehicle lamp.

BACKGROUND ART

Conventionally, a decorative lighting device is proposed, which includes a light non-transmissive part and a decorative part, where the light non-transmissive part is formed by a plate material through which light transmissive areas having minute dot shapes, or the like, are formed, with the other area being a light non-transmissive area, and the decorative part is formed by a plate material through which openings having a specific decorative shape are formed, and light can be irradiated from behind them (refer to PTL 1, for example). In this decorative lighting device, for example, users can recognize the design shape according to the openings when the light source is turned on (see, for example, PTL 1).

CITATION LIST

Patent Literature

PTL 1: Japanese Patent Laid-open No. 2018-6026

SUMMARY OF THE INVENTION

Problems to be Solved by the Invention

The applicant has been studying to apply such decorative lighting device to a vehicle lamp, and considering, in particular, to form light transmissive areas having minute dot shapes, or the like, in a decorative part, too. This is because the two plates will both have light transmissive areas having minute dot shapes, or the like, making it difficult to recognize the light chamber configuration when the light source is not turned on, thereby improving the design.

However, such vehicle lamps sometimes cause moire due to interference between minute light transmissive areas, which improves the design quality by making it difficult to recognize the light chamber configuration, but at the same time degrading the design quality due to the moire.

The present invention is made to solve such conventional problems, the object of which is to provide a vehicle lamp that can suppress design deterioration due to moire.

Means for Solving the Problem

A vehicle lamp according to the present invention includes: a first plate material that includes a plurality of first light transmissive areas transmitting light therethrough and a first light non-transmissive area positioned between the plurality of first light transmissive areas and not transmitting light therethrough; a second plate material that includes a plurality of second light transmissive areas transmitting light therethrough and a second light non-transmissive area positioned between the plurality of second light transmissive areas and not transmitting light therethrough, the second plate material being layered on the first plate material; and a light source that emits light via the plurality of first light transmissive areas of the first plate material and the plurality of second light transmissive areas of the second plate material, where the plurality of second light transmissive areas are larger, in acreage, than the plurality of first light transmissive areas.

Another vehicle lamp according to the present invention includes: a first plate material that includes a plurality of first light non-transmissive areas not transmitting light therethrough and a first light transmissive area positioned between the plurality of first light non-transmissive areas and transmitting light therethrough; a second plate material that includes a plurality of second light non-transmissive areas not transmitting light therethrough and a second light transmissive area positioned between the plurality of second light non-transmissive areas and transmitting light therethrough, the second plate material being layered on the first plate material; and a light source that emits light via the first light transmissive area of the first plate material and the second light transmissive area of the second plate material, where a shortest distance between the plurality of second light non-transmissive areas is set longer than a shortest distance between the plurality of first light non-transmissive areas.

Effect of the Invention

The present invention provides a vehicle lamp vehicle lamp that can suppress design deterioration due to moire.

MODE FOR CARRYING OUT THE INVENTION

Hereinafter, the present invention will be described with reference to preferred embodiments. Note that the present invention is not limited to the embodiments described below and can be appropriately modified without departing from the scope of the present invention. In addition, in the embodiments described below, there are places where the illustration and description of some configurations are omitted. However, it is needless to say that known or well-known techniques are appropriately applied to the details of the omitted techniques within a range in which contradiction with the contents described below does not occur.

Figure 1:
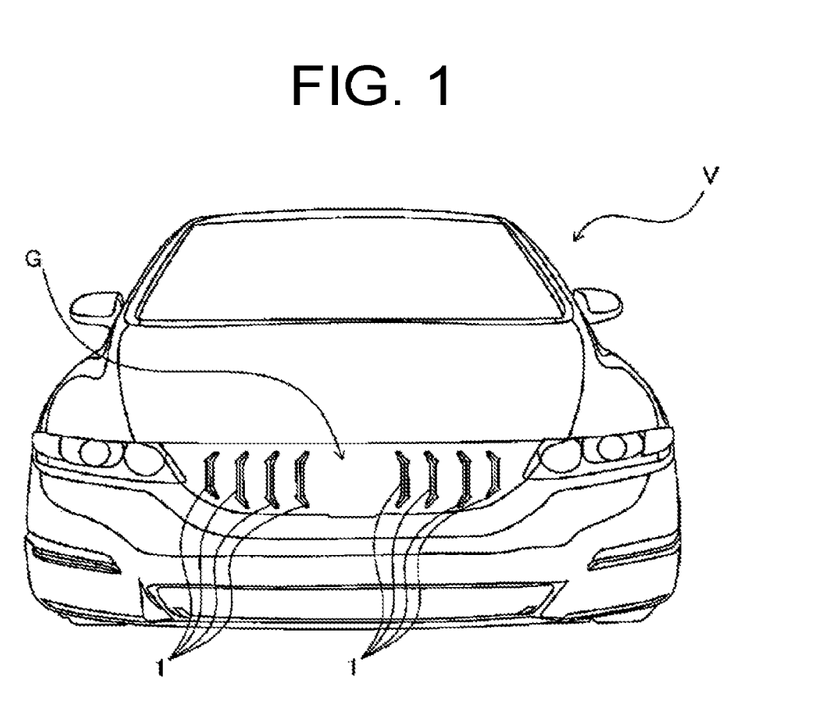
FIG. 1 is a front view of a vehicle to which a vehicle lamp according to the present embodiment is applied.

FIG. 1 is a front view of a vehicle to which a vehicle lamp according to the present embodiment is applied. As illustrated in FIG. 1, a vehicle lamp 1 according to the present embodiment is provided in a front grille G, which is between the head lamps at the front face of a vehicle V, for example. In the present embodiment, each vehicle lamp 1 has a bracket shape in front view, and two pairs of four of the vehicle lamp 1 are provided on the left and the right, so that the pairs are symmetrical to each other, for example.

Figure 2:
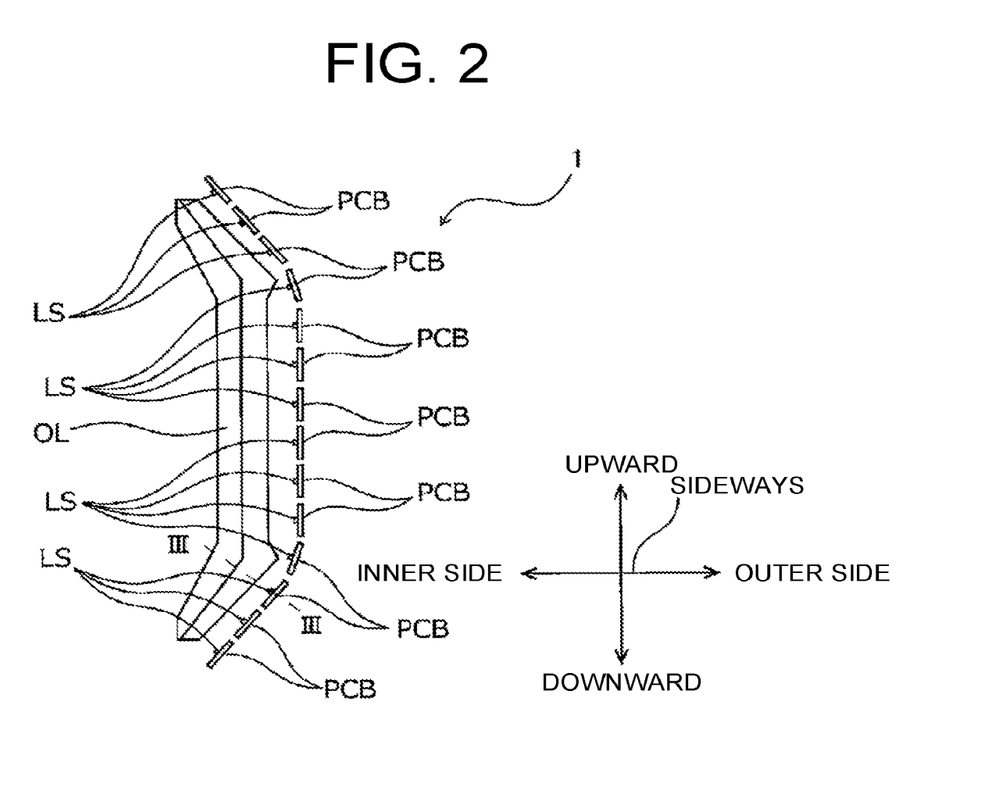
FIG. 2 is a front view of one of the vehicle lamps illustrated in FIG. 1.
Figure 3:
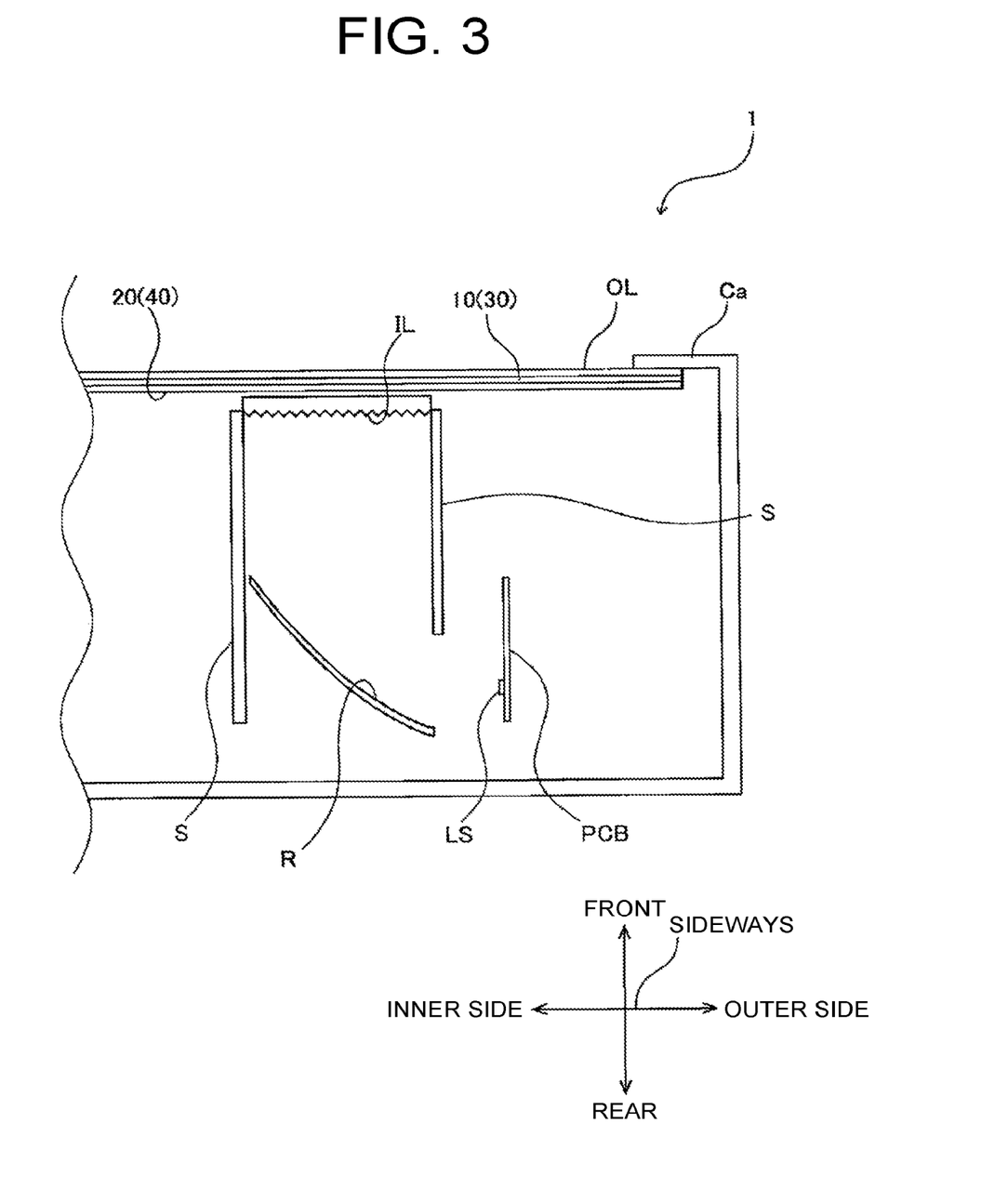
FIG. 3 is a sectional view of the vehicle lamp illustrated in FIG. 2.

FIG. 2 is a front view of one of the vehicle lamps 1 illustrated in FIG. 1, and FIG. 3 is a sectional view of the vehicle lamp 1 illustrated in FIG. 2. Note that, in FIG. 2, illustration of a part of the configuration of a case, which is described later (refer to the reference numeral Ca), or the like, is omitted.

As illustrated in FIG. 2 and FIG. 3, the vehicle lamp 1 includes a substrate PCB on which a light source LS is mounted, a reflector R, shields S, an inner lens IL, a first plate material 10, a second plate material 20, an outer lens OL, and a case Ca. The substrate PCB, the reflector R, the shields S, and the inner lens IL are stored in the case Ca.

As illustrated in FIG. 2 and FIG. 3, the substrate PCB is positioned so that its normal direction is oriented sideways of the vehicle (including oblique sideway, which is oriented slightly upward or downward). The light source LS mounted on the substrate PCB is also oriented so that its optical axis is oriented sideways (particularly, a vehicle inner direction), and is configured to emit light in the vehicle inner direction. The reflector R is a reflection surface made by evaporation, painting, or the like, of aluminum or silver. The reflection surface is formed by an ellipsoid of revolution or a free form surface so as to reflect the light from the light source Ls towards the front side of the vehicle.

The shields S guide the light reflected at the reflector R, towards the inner lens IL. This shields S are provided at both the inner side and the outer side of the inner lens IL. The shields S are also formed so that a surface thereof that faces the inner lens IL is white, or the like, for example. Accordingly, the shields S guide the light reflected at the reflector R to the inner lens IL, by reflecting the light on the inner surface thereof. Note that the shields S are not limited to white, or the like, and may be formed in black, or the like, so that the light reflected at the reflector R is prevented from leaking to outside.

The inner lens IL is provided towards the front side of the vehicle relative to the reflector R, and functions as a diffusion plate to receive the light guided by the shields S and diffuse the light. This inner lens IL is in milky white, for example.

The first plate material 10, the second plate material 20, and the outer lens OL are layered to be in contact with one another, and are provided towards the front side of the vehicle relative to the inner lens IL. The first plate material 10, the second plate material 20, and the outer lens OL are located to close the opening portion of the case Ca. The light diffused by the inner lens IL passes through the second plate material 20, the first plate material 10, and the outer lens OL, in the stated order, to be emitted towards the front side of the vehicle.

The first plate material 10 and the second plate material 20 have light transmissive areas and a light non-transmissive area, as described later. The light arrived at the first plate material 10 and the second plate material 20 from the light source LS via the inner lens IL reaches the outer lens OL via the light transmissive areas of the first plate material 10 and the second plate material 20. The outer lens OL is formed of a transparent resin, for example, and emits the light having passed through the light transmissive areas of the first plate material 10 and the second plate material 20, towards the front side of the vehicle.

Figure 4:
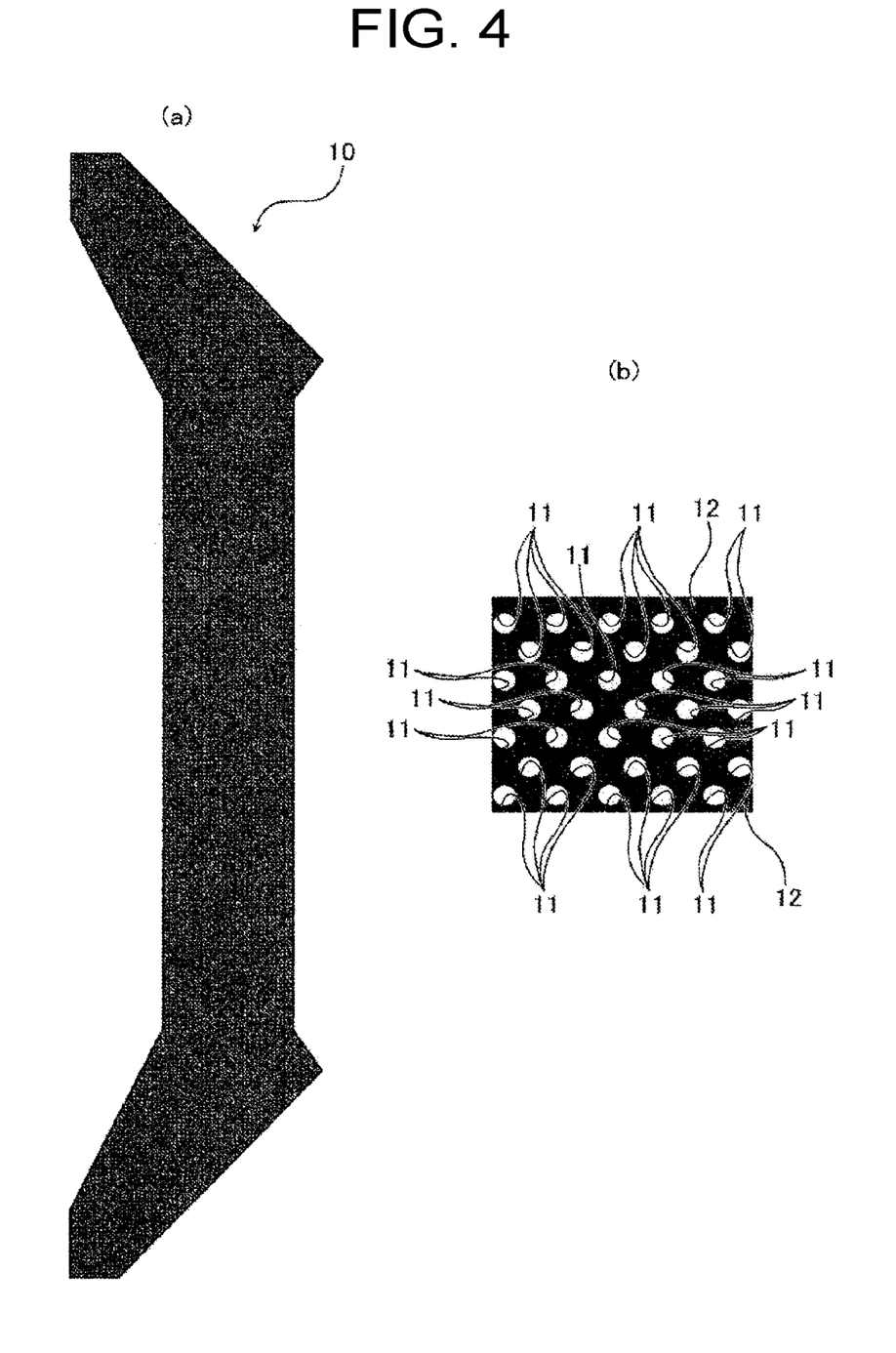
FIG. 4 is a plan view of a first plate material illustrated in FIG. 3, in which (a) is an overall view, and (b) is a partially enlarged view.

FIG. 4 is a plan view of the first plate material 10 illustrated in FIG. 3, in which (a) is an overall view, and (b) is a partially enlarged view. As illustrated in FIG. 4(a), the first plate material 10 has a bracket shape in planar view. The first plate material 10 is, as illustrated in FIG. 4(b), made of a non-transmissive plate material through entirety of which light does not pass, and a plurality of dot-shaped through holes (e.g., 1.0 mm 2 or smaller) are formed through the non-transmissive plate material. The part with the through holes forms the light transmissive areas (first light transmissive areas) 11. On the other hand, the part with no through hole forms the light non-transmissive area (i.e., the part between the light transmissive areas 11) is the light non-transmissive area (first light non-transmissive area) 12, through which light does not pass.

Note that the light transmissive areas 11 are not limited to be those formed by through holes, and may be formed by through holes filled with light transmissive resin, for example. Furthermore, in the above-stated description, the first plate material 10 has a configuration in which through holes are provided through a non-transmissive plate material. However, not particularly limited to this, the first plate material 10 may be a transmissive plate material which transmits light therethrough, on which non-transmissive paint, or the like, is printed in a mesh formation, not transmitting light therethrough.

Figure 5:
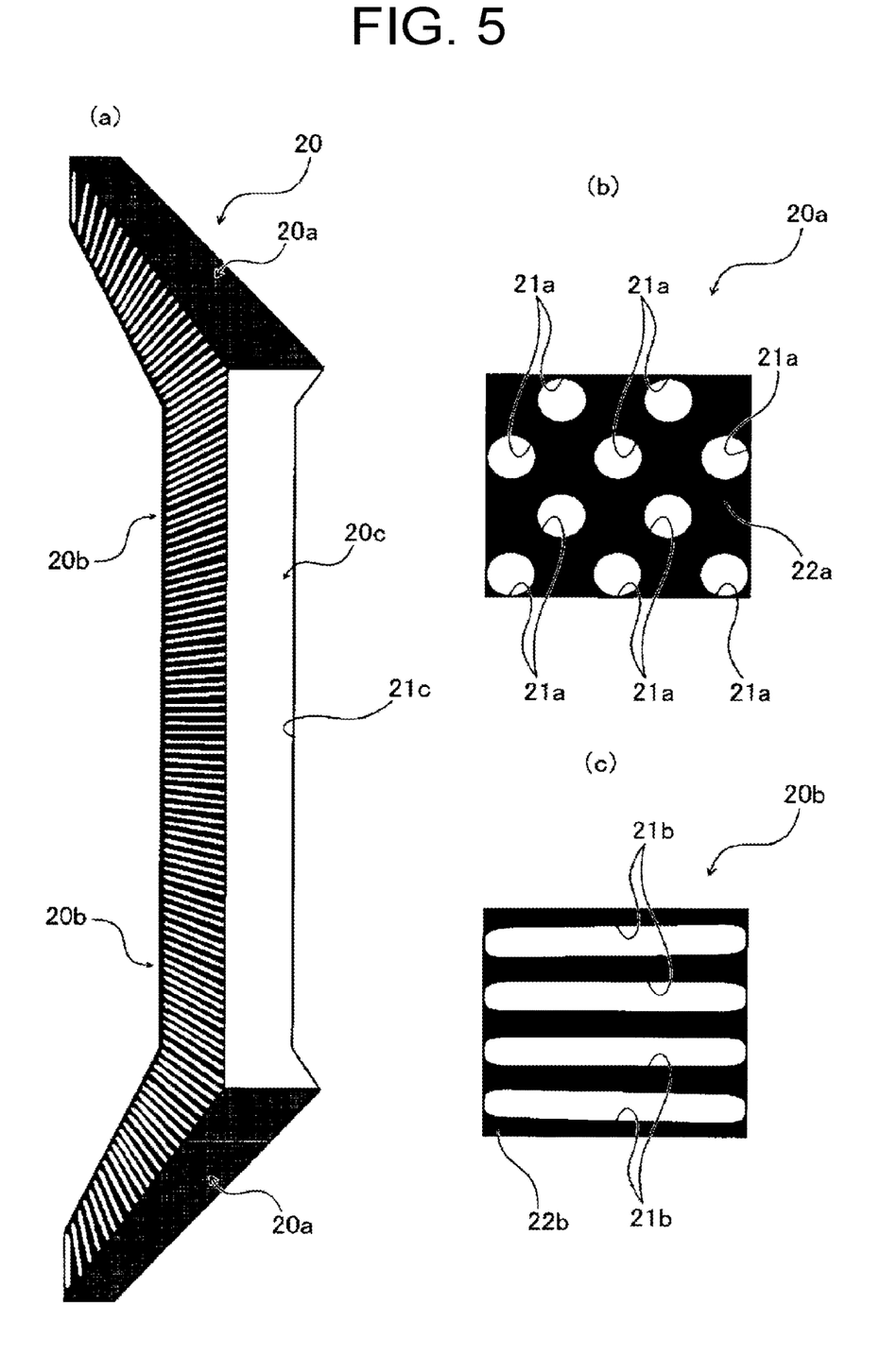
FIG. 5 is a plan view of a second plate material illustrated in FIG. 3, in which (a) is an overall view, (b) is a first partially enlarged view, and (c) is a second partially enlarged view.

FIG. 5 is a plan view of the second plate material 20 illustrated in FIG. 3, in which (a) is an overall view, (b) is a first partially enlarged view, and (c) is a second partially enlarged view. As illustrated in FIG. 5(a), the second plate material 20 also has a bracket shape in planar view. In particular, the outer shape of the second plate material 20 matches the outer shape of the first plate material 10. The above-described second plate material 20 is, just as the first plate material 10, made of a non-transmissive plate material through entirety of which light does not pass, and a plurality of through holes are formed through the non-transmissive plate material. In the present embodiment, the second plate material 20 is divided in three areas, i.e., a dot part 20a, a line part 20b, and a large part 20c.

As illustrated in FIG. 5(b), the dot part 20a forms areas in which a plurality of dot-shaped through holes are formed through the non-transmissive plate material. The part with the through holes forms light transmissive areas (second light transmissive areas, or dot-shaped light transmissive areas) 21a. Meanwhile, the part without through hole (i.e., the part between the light transmissive areas 21a) forms a light non-transmissive area (second light non-transmissive area) 22a, not transmitting light therethrough.

As illustrated in FIG. 5(c), the line part 20b forms areas in which a plurality of line-shaped through holes (an exemplary shape different from a dot shape) are formed through the non-transmissive plate material. The part with the through holes forms light transmissive areas (second light transmissive areas, or variant light transmissive areas) 21b. Meanwhile, the part without through hole (i.e., the part between the light transmissive areas 21b) forms a light non-transmissive area (second light non-transmissive area) 22b, not transmitting light therethrough.

Note that the light transmissive areas 21a and 21b are not limited to be those formed by through holes, and may be formed by through holes filled with light transmissive resin, for example. Furthermore, in the above-stated description, the second plate material 20 has a configuration in which through holes are provided through a non-transmissive plate material. However, not particularly limited to this, the second plate material 20 may be a transmissive plate material which transmits light therethrough, on which non-transmissive paint, or the like, is printed in a mesh formation, not transmitting light therethrough.

In the present embodiment, each of the plurality of light transmissive areas 21a and 21b of the second plate material 20 is larger, in acreage, than each of the plurality of light transmissive areas 11 of the first plate material 10. Preferably, each of the plurality of light transmissive areas 21a and 21b is 9 or more times larger, in acreage, than each of the plurality of light transmissive areas 11 of the first plate material 10.

In addition, each of the plurality of light transmissive areas 21a and 21b of the second plate material 20 is less than 150 times larger (preferably, less than 50 times larger, or more preferably, less than 20 times larger), in acreage, than each of the plurality of light transmissive areas 11 of the first plate material 10.

Note that each of the light transmissive areas 21b of the line part 20b is larger, in acreage, than each of the light transmissive areas 21a of the dot part 20a.

The acreage of the through hole making the large part 20c is larger than the acreage of each of the through holes making the plurality of dot-shaped light transmissive areas 21a and the plurality of line-shaped light transmissive areas 21b. The part with the through hole forms a light transmissive area (large light transmissive area) 21c (refer to FIG. 5(a)). This light transmissive area 21c is 150 times or more larger, in acreage, than each one of the plurality of light transmissive areas 11 of the first plate material 10.

Figure 6:
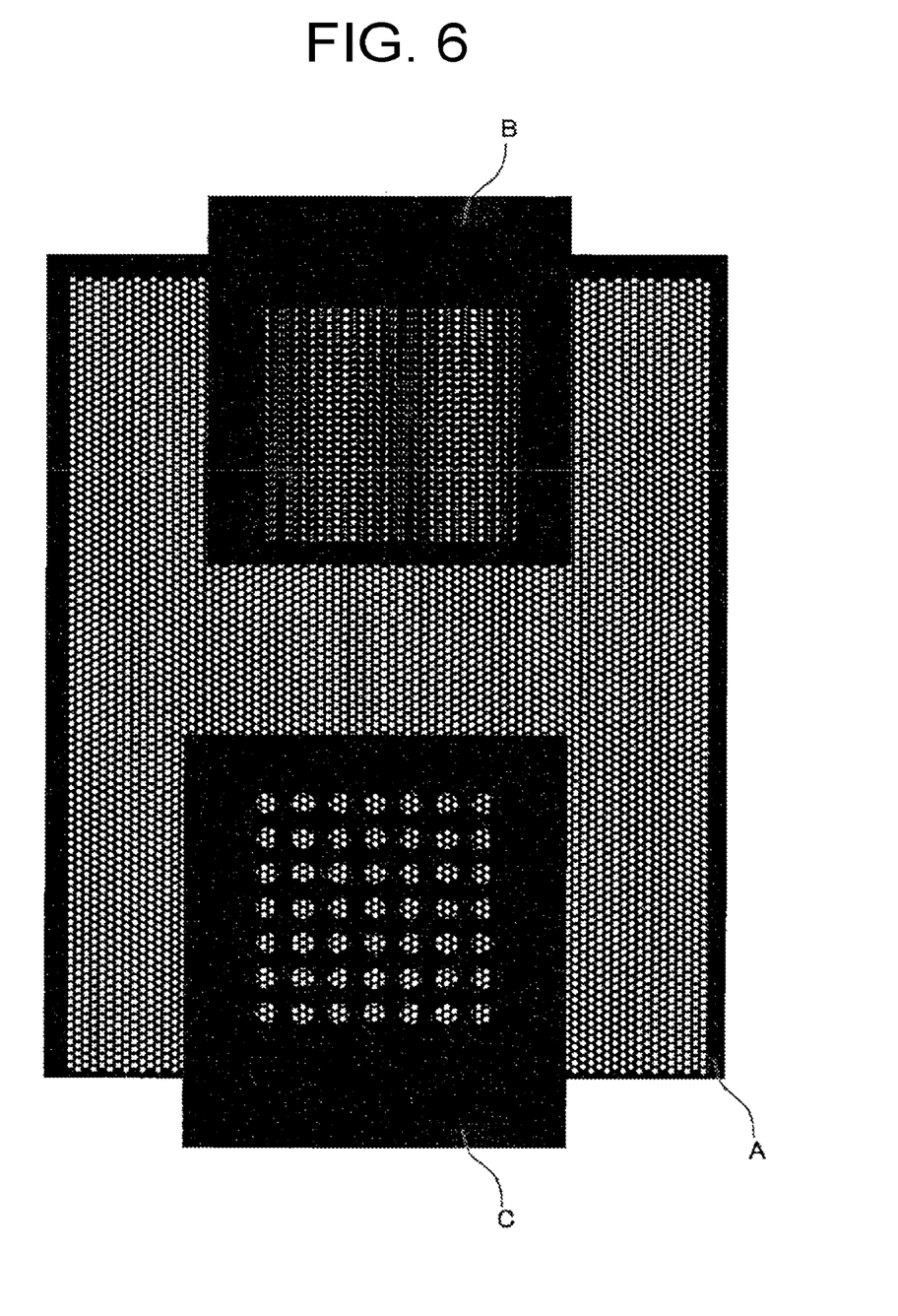
FIG. 6 is a plan view for explaining an operation of a vehicle lamp according to the present embodiment.

The following describes an operation of the vehicle lamp 1 according to the present embodiment. FIG. 6 is a plan view for explaining an operation of the vehicle lamp 1 according to the present embodiment. FIG. 6 illustrates plate materials A to C, in which the size of a through hole of a plate material A is the same as the size of a through hole of a plate material B. Meanwhile, a through hole of the plate material C is 9 times larger, in size, than each through hole of the plate materials A and B.

When overlapping the plate materials A and B, having through holes of the same acreage, a moire is generated as illustrated in FIG. 6. On the contrary, when the plate material C, having 9 times larger through holes, in size, is overlapped on the plate material A, moire generation is prevented as illustrated in FIG. 6.

Therefore, as in the above-described embodiment, when the acreage of the light transmissive areas 21a and 21b of the second plate material 20 is larger than the acreage of the light transmissive areas 11 of the first plate material 10, moire generation is more prevented than in the case when the plate material A and the plate material B are overlapped on each other. When the acreage of the light transmissive areas 21a and 21b of the second plate material 20 is 9 or more time larger than the acreage of the light transmissive areas 11 of the first plate material 10, moire generation is extremely prevented.

Also as illustrated in FIG. 5(a), in the second plate material 20, the light transmissive areas 21a are dot-shaped, and the light transmissive areas 21b are line-shaped. In other words, the light transmissive areas 21a and 21b are differently shaped from each other. Accordingly, while the light source LS is turned on, the way the light passing through the light transmissive areas 21a looks is different from the way the light passing through the light transmissive areas 21b looks, which is represented as a concentration difference.

In addition, since the large part 20c of the second plate material 20 is provided with a light transmissive area 21c, which has an acreage larger than those of the dot-shaped light transmissive areas 21a and line-shaped light transmissive areas 21b, the concentration difference can be represented in three stages.

Moreover, depending on the acreage of the light transmissive areas 11 of the first plate material 10, the acreage of the light transmissive areas 21a and 21b of the second plate material 20 is less than 150 times larger (preferably, less than 50 times larger, or more preferably, less than 20 times larger) than the acreage of the light transmissive areas 11 of the first plate material 10, which makes it difficult to recognize the inside of the light chamber from outside when the light source LS is turned off and helps prevent design degradation.

In the above-described manner, in the vehicle lamp 1 according to the present embodiment, the acreages of the plurality of light transmissive areas 21a and 21b is larger than the acreages of the plurality of light transmissive areas 11. Therefore, a vehicle lamp 1 can be provided, which can prevent moire generation attributed to the same acreage among the light transmissive areas 11, 21a, 21b, thereby preventing design degradation due to generation of moire.

In addition, the plurality of light transmissive areas 21a and 21b are 9 or more times larger, in acreage, than the plurality of light transmissive areas 11. Therefore, the acreages of the light transmissive areas 11 greatly differ from the acreages of the light transmissive areas 21a and 21b, which helps extremely prevent moire generation.

In addition, the plurality of light transmissive areas 21a and 21b include a plurality of dot-shaped light transmissive areas 21a and a plurality of line-shaped light transmissive areas 21b differently shaped from the dot-shaped light transmissive areas 21a. The light transmissive areas 21a and 21b can thus represent a concentration difference therebetween, by creating a difference in transmission shape patterns. Accordingly, the design can improve.

The following describes a vehicle lamp according to the second embodiment. The vehicle lamp according to the second embodiment is the same as the vehicle lamp according to the first embodiment, except part of the configuration. The following describes differences from the first embodiment.

Figure 7:
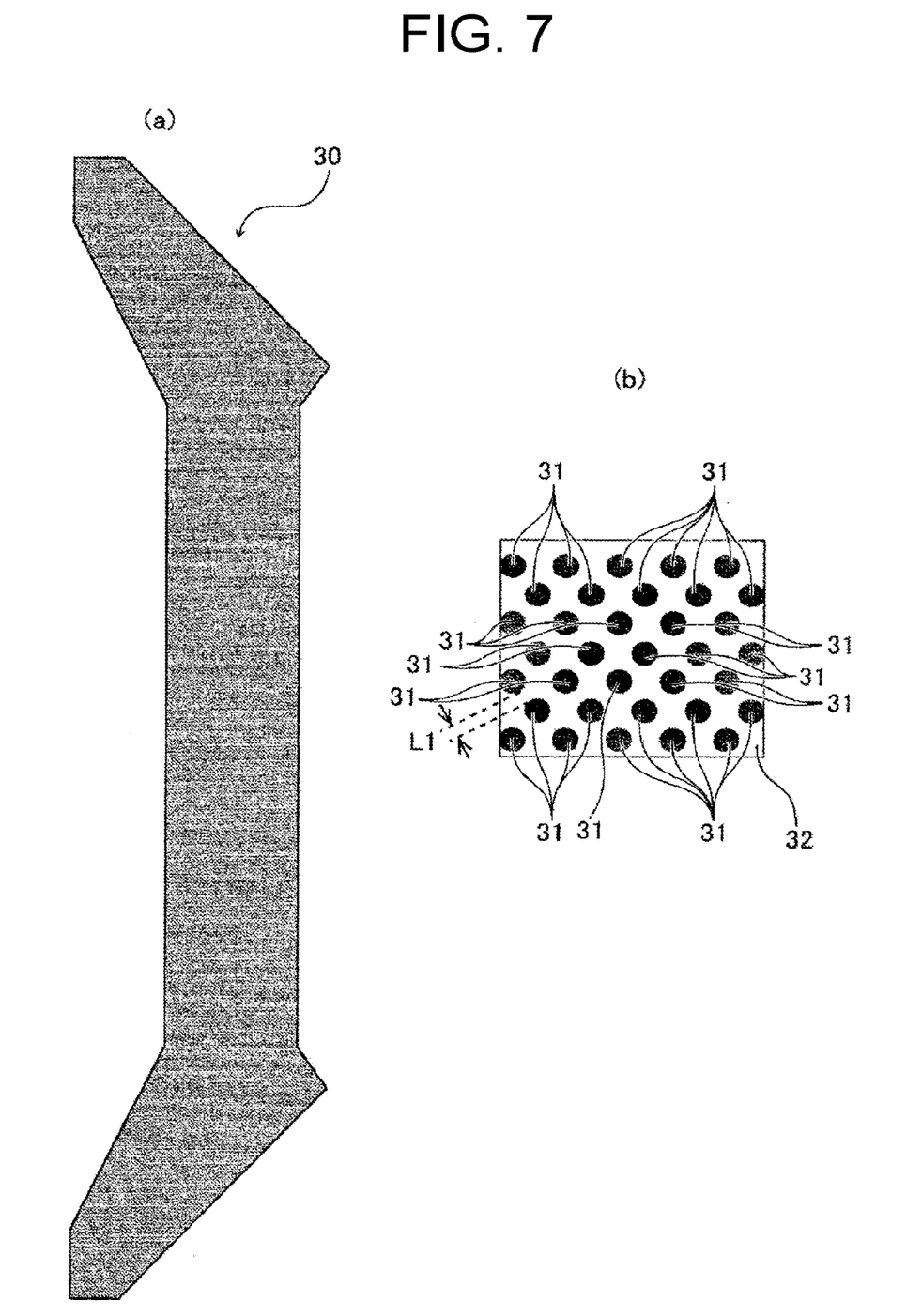
FIG. 7 is a plan view of a first plate material according to a second embodiment, in which (a) is an overall view, and (b) is a partially enlarged view.
Figure 8:
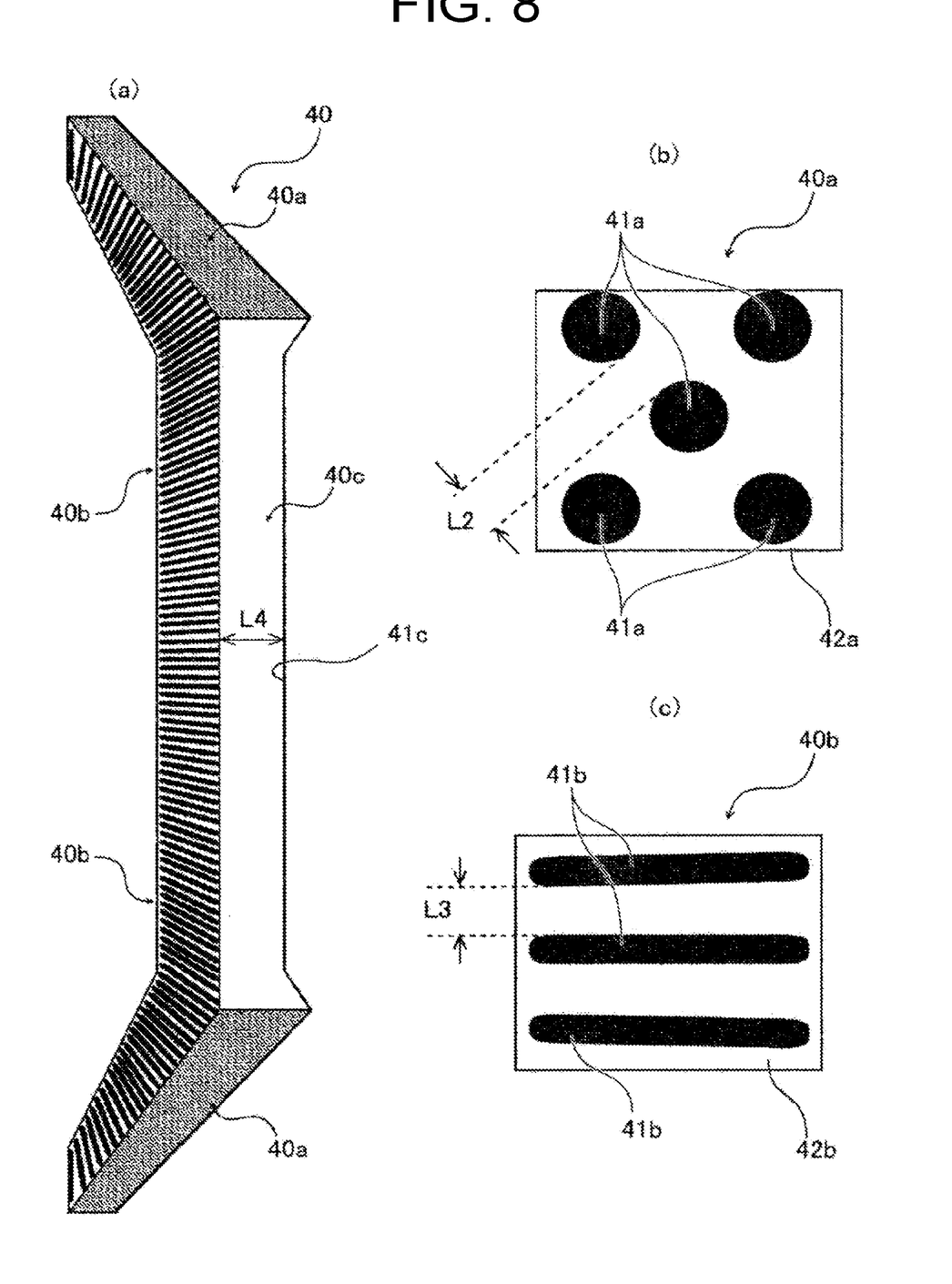
FIG. 8 is a plan view of a second plate material according to the second embodiment, in which (a) is an overall view, (b) is a first partially enlarged view, and (c) is a second partially enlarged view.

The vehicle lamp 1 according to the second embodiment includes a first plate material 30 and a second plate material 40, which are different from the counterparts of the first embodiment.

FIG. 7 is a plan view of the first plate material 30 according to the second embodiment, in which (a) is an overall view, and (b) is a partially enlarged view. As illustrated in FIG. 7(a), the first plate material 30 has a bracket shape in planar view. The first plate material 30 is, as illustrated in FIG. 7(b), made of a transmissive plate material through entirety of which light passes. The first plate material 30 is the transmissive plate material, on which non-transmissive paint, or the like, which does not transmit light therethrough, is printed to form a plurality of dot shapes. The part with the non-transmissive paint, or the like, forms light non-transmissive areas (first light non-transmissive areas) 31. On the other hand, the part with no non-transmissive paint, or the like, (i.e., the part between the light non-transmissive areas 31) forms a light transmissive area (the first light transmissive area) 32, which transmits light therethrough.

Note that the first plate material 30 is formed, for example, by attaching, by an adhesive, or the like, a transmissive plate material that transmits light therethrough and a non-transmissive plate material that does not transmit light therethrough, and partially removing the non-transmissive plate material so that dot-shaped light non-transmissive areas 31 remain.

FIG. 8 is a plan view of the second plate material 40 according to the second embodiment, in which (a) is an overall view, (b) is a first partially enlarged view, and (c) is a second partially enlarged view. As illustrated in FIG. 8(a), the second plate material 40 also has a bracket shape in planar view. In particular, the outer shape of the second plate material 40 matches the outer shape of the first plate material 30. The above-described second plate material 40 is, just as the first plate material 30, made of a transmissive plate material through entirety of which light passes, on which non-transmissive paint, or the like, which does not transmit light therethrough, is printed. In the second embodiment, the second plate material 20 are divided in three areas, i.e., a dot part 40a, a line part 40b, and a large part 40c.

As illustrated in FIG. 8(b), the dot part 40a forms areas in which a plurality of dot shapes, not transmitting light therethrough, are printed on the transmissive plate material. The part with printed dot shapes forms light non-transmissive areas (second light non-transmissive areas, dot-shaped light non-transmissive areas) 41a. Meanwhile, the part without any printed dot shape (i.e., the part between the light non-transmissive areas 41a) forms a light transmissive area (second light transmissive area) 42a, transmitting light therethrough.

As illustrated in FIG. 8(c), the line part 40b forms areas in which a plurality of line shapes (an exemplary shape different from a dot shape), not transmitting light therethrough, are printed on the transmissive plate material. The part with printed line shapes forms light non-transmissive areas (second light non-transmissive areas, variant light non-transmissive areas) 41b. Meanwhile, the part without any printed line shape (i.e., the part between light non-transmissive areas 41b) forms a light transmissive area (second light transmissive area) 42b, transmitting light therethrough.

Just as the first plate material 30, the second plate material 40 may be also formed by layering a transmissive plate material and a non-transmissive plate material, and partially removing the non-transmissive plate material.

In the present embodiment, the shortest distance L2 between the plurality of light non-transmissive areas 41a of the second plate material 40 and the shortest distance L3 between the plurality of light non-transmissive areas 41b of the second plate material 40 (refer to FIG. 8(b) and FIG. 8(c)) are each set longer than the shortest distance L1 (refer to FIG. 7(b): e.g., 1 mm or smaller) between the plurality of light non-transmissive areas 31 of the first plate material 30. Preferably, each of the shortest distance L2 between the plurality of light non-transmissive areas 41a and the shortest distance L3 between the plurality of light non-transmissive areas 41b is set 3 or more times longer than the shortest distance L1 between the plurality of light non-transmissive areas 31 of the first plate material 10.

In addition, each of the shortest distance L2 between the plurality of light non-transmissive areas 41a of the second plate material 40 and the shortest distance L3 between the plurality of light non-transmissive areas 41b of the second plate material 40 is set is less than 150 times longer (preferably, less than 50 times longer, or more preferably, less than 20 times longer) than the shortest distance L1 between the plurality of light transmissive areas 11 of the first plate material 10.

Note that the shortest distance L3 between the light non-transmissive areas 41b of the line part 40b is set longer than the shortest distance L2 between the light non-transmissive areas 41a of the dot part 40a.

The large part 40c (refer to FIG. 8(a)) is an area through which a large through hole is formed. The part with the through hole forms a light transmissive area (large light transmissive area) 41c. The shortest distance L4 in the light transmissive area 41c is set 150 or more times longer than the shortest distance L1 between the plurality of light non-transmissive areas 31 of the first plate material 30.

The following describes an operation of the vehicle lamp 1 according to the second embodiment. First, in the second plate material 40, when the shortest distance L2 between the plurality of light non-transmissive areas 41a and the shortest distance L3 between the plurality of light non-transmissive areas 41b are each set longer than the shortest distance L1 between the plurality of light non-transmissive areas 31 of the first plate material 30, moire generation is prevented just as in the first embodiment. When the former shortest distance L2 and L3 are each set 3 or more times longer than the latter shortest distance L1, moire generation is extremely prevented.

In addition, in the second plate material 40, the light non-transmissive areas 41a are dot-shaped, and the light non-transmissive areas 41b are line-shaped. In other words, the light non-transmissive areas 41a and 41b are differently shaped from each other. Accordingly, while the light source LS is turned on, the way the light passing through the light transmissive areas 42a and 42b, respectively between the light non-transmissive areas 41a and 41b, looks different, which is represented as a concentration difference.

In addition, since the large part 40c of the second plate material 40 is provided with a light transmissive area 41c, which has the shortest distance L4 longer than the shortest distance L2 between the plurality of light non-transmissive areas 41a and the shortest distance L3 between the plurality of light non-transmissive areas 41b, the concentration difference can be represented in three stages.

Moreover, depending on the shortest distance L1 of the light non-transmissive areas 31 of the first plate material 30, the shortest distance L2 between the plurality of light non-transmissive areas 41a of the second plate material 40 and the shortest distance L3 between the plurality of light non-transmissive areas 41b of the second plate material 40 are each less than 150 times longer (preferably, less than 50 times longer, or more preferably, less than 20 times longer) than the shortest distance L1, which makes it difficult to recognize the inside of the light chamber from outside when the light source LS is turned off and helps prevent design degradation.

In the above-described manner, in the vehicle lamp 1 according to the second embodiment, the shortest distance L2 between the plurality of light non-transmissive areas 41a and the shortest distance L3 between the plurality of light non-transmissive areas 41b are each set longer than the shortest distance L1 between the plurality of light non-transmissive areas 31. Therefore, a vehicle lamp 1 can be provided, which can prevent such conditions where moire is liable to occur attributed to the shortest distances L1 to L3 respectively for the light non-transmissive areas 31, 41a, and 41b being close attributed to the shortest distances L1 to L3 being the same length, thereby preventing design degradation due to generation of moire.

In addition, each of the shortest distance L2 between the plurality of light non-transmissive areas 41a and the shortest distance L3 between the plurality of light non-transmissive areas 41*b* is set 3 or more times longer than the shortest distance L1 between the plurality of light non-transmissive areas 31. By causing the shortest distances L1 and L2, and L3 to greatly differ from each other, the acreages of the light transmissive areas 32, and 42*a* and 42*b* greatly differ, which helps extremely prevent moire generation.

In addition, the plurality of light non-transmissive areas 41*a* and 41*b* include a plurality of dot-shaped light non-transmissive areas 41*a* and a plurality of line-shaped light non-transmissive areas 41*b* differently shaped from the dot-shaped light non-transmissive areas 41*a*. By causing the light non-transmissive areas 41*a* and 41*b* to differ in shape, the light transmissive areas 42*a* and 42*b* accordingly differ in shape. As a result, the shape pattern of light transmission differs, and thus a concentration difference is generated therebetween. Accordingly, the design can improve.

Although the present invention has been described above based on the embodiments, the present invention is not limited to the above-described embodiments, and modifications may be made without departing from the spirit of the present invention, and publicly known techniques may be combined. In addition, the techniques of the embodiments may be combined within a possible range.

In the above-described first embodiment, the dot-shaped light transmissive areas 11 and 21*a* are regularly arranged. However, the dot-shaped light transmissive areas 11 and 21*a* do not have to be regularly arranged. Furthermore, in the first embodiment, all the line-shaped light transmissive areas 21*b* have the same longitudinal direction which is the vehicle inner direction (i.e., the inner direction of the bracket). However, not particularly limited to this, not all the line-shaped light transmissive areas 21*b* may have the same longitudinal direction.

In addition, in the first plate material 10, each of the plurality of light transmissive areas 11 has the same acreage. However, not particularly limited to this, not all the plurality of light transmissive areas 11 may have the same acreage as each other. In this case, those having the largest acreage and those having the smallest acreage may be, for example, within the 50% or more and 150% or less of a reference value defined based on the average or the median of the acreages of the plurality of light transmissive areas 11. The foregoing also applies to the plurality of light transmissive areas 21*a* of the second plate material 20.

When the plurality of light transmissive areas 21*a* and 21*b* of the second plate material 20 are not the same in acreage as each other, the average or the median thereof may be larger (preferably, 9 or more times larger) than the acreage of the plurality of light transmissive areas 11 of the first plate material 10. Similarly, when the plurality of light transmissive areas 11 of the first plate material 10 are not the same in acreage as each other, the acreage of the light transmissive areas 21*a* and 21*b* of the second plate material 20 may be larger (preferably, 9 or more times larger) than the average or the median of the acreages of the plurality of light transmissive areas 11 of the first plate material 10.

The foregoing also applies to the second embodiment. The dot-shaped light non-transmissive areas 31 and 41*a* may be irregularly arranged, and the line-shaped light non-transmissive areas 41*b* do not have to have the same longitudinal direction which is the vehicle inner direction. The shortest distances for the plurality of light non-transmissive areas 31, and 41*a* and 41*b* do not have to be the same as each other. When the shortest distances are not the same as each other, the shortest distances may be, for example, within the 50% or more and 150% or less of a reference value. When the shortest distances are not the same as each other, the average or the median of the shortest distances, which is made longer (e.g., 3 or more times longer), may be adopted. In addition, in the vehicle lamp 1 according to the present embodiment, the first plate material 10 and the second plate material 20 are layered to be in contact with each other. However, not particularly limited to this, the first plate material 10 and the second plate material 20 may be layered in separation from each other, with another member or a void interposed therebetween.

Furthermore, the plurality of light transmissive areas 21*a* and 21*b* illustrated in FIG. 5 and the plurality of light non-transmissive areas 41*a* and 41*b* illustrated in FIG. 8 may be arranged to form a certain design, so as to make viewers recognize the certain design. For example, the plurality of light transmissive areas 21*a* may assemble to form a substantially arrow shape, to make viewers recognize the arrow shape when the light source LS is turned on.

Moreover, as illustrated in FIG. 3, the vehicle lamp 1 according to the present embodiment includes a light source LS, a reflector R, a shield S, an inner lens IL, and the like. However, not particularly limited to this, the vehicle lamp 1 may have a different configuration as long as light can be irradiated on a portion emitting light as a design.

DESCRIPTION OF REFERENCE NUMERALS

1: Vehicle lamp
10: First plate material
11: Light transmissive areas (first light transmissive areas)
12: Light non-transmissive area (first light non-transmissive area)
20: Second plate material
21*a*: Light transmissive areas (second light transmissive areas, dot-shaped light transmissive areas)
21*b*: Light transmissive areas (second light transmissive areas, variant light transmissive areas)
22*a*, 22*b*: Light non-transmissive area (second light non-transmissive area)
30: First plate material
31: Light non-transmissive areas (first light non-transmissive areas)
32: Light transmissive area (first light transmissive area)
40: Second plate material
41*a*: Light non-transmissive areas (second light non-transmissive areas, dot-shaped light non-transmissive areas)
41*b*: Light non-transmissive areas (second light non-transmissive areas, variant light non-transmissive areas)
42*a*, 42*b*: light transmissive area (second light transmissive area)
L1 to L4: Shortest distance
LS: Light source

The invention claimed is:

1. A vehicle lamp comprising:
a first plate material that includes a plurality of first light transmissive areas transmitting light therethrough and a first light non-transmissive area positioned between the plurality of first light transmissive areas and not transmitting light therethrough;
a second plate material that includes a plurality of second light transmissive areas transmitting light therethrough and a second light non-transmissive area positioned between the plurality of second light transmissive areas and not transmitting light therethrough, the second plate material being layered on the first plate material; and a light source that emits light via the plurality of first light transmissive areas of the first plate material and the plurality of second light transmissive areas of the second plate material, wherein the plurality of second light transmissive areas are larger, in acreage, than the plurality of first light transmissive areas, wherein the plurality of second light transmissive areas include a plurality of dot-shaped light transmissive areas and a plurality of variant light transmissive areas differently shaped from the plurality of dot-shaped light transmissive areas.

2. The vehicle lamp according to claim 1, wherein the plurality of second light transmissive areas are 9 or more times larger, in acreage, than the plurality of first light transmissive areas.

3. A vehicle lamp comprising:

a first plate material that includes a plurality of first light non-transmissive areas not transmitting light therethrough and a first light transmissive area positioned between the plurality of first light non-transmissive areas and transmitting light therethrough;

a second plate material that includes a plurality of second light non-transmissive areas not transmitting light therethrough and a second light transmissive area positioned between the plurality of second light non-transmissive areas and transmitting light therethrough, the second plate material being layered on the first plate material; and a light source that emits light via the first light transmissive area of the first plate material and the second light transmissive area of the second plate material, wherein a shortest distance between the plurality of second light non-transmissive areas is set longer than a shortest distance between the plurality of first light non-transmissive areas, wherein the plurality of second light non-transmissive areas include a plurality of dot-shaped light non-transmissive areas and a plurality of variant light non-transmissive areas differently shaped from the plurality of dot-shaped light non-transmissive areas.

4. The vehicle lamp according to claim 3, wherein the shortest distance between the plurality of second light non-transmissive areas of the second plate material is set 3 or more times longer than the shortest distance between the plurality of first light non-transmissive areas of the first plate material.

* * * * *